United States Patent
Moriyama et al.

(10) Patent No.: US 11,499,096 B2
(45) Date of Patent: *Nov. 15, 2022

(54) SEMICONDUCTOR NANOPARTICLES AND CORE/SHELL SEMICONDUCTOR NANOPARTICLES

(71) Applicant: SHOEI CHEMICAL INC., Tokyo (JP)

(72) Inventors: Takafumi Moriyama, Tokyo (JP); Ryosuke Motoyoshi, Tokyo (JP)

(73) Assignee: SHOEI CHEMICAL INC., Tokyo (JP)

( * ) Notice: Subject to any disclaimer, the term of this patent is extended or adjusted under 35 U.S.C. 154(b) by 236 days.

This patent is subject to a terminal disclaimer.

(21) Appl. No.: 16/958,294

(22) PCT Filed: Dec. 19, 2018

(86) PCT No.: PCT/JP2018/046864
§ 371 (c)(1),
(2) Date: Jun. 26, 2020

(87) PCT Pub. No.: WO2019/131402
PCT Pub. Date: Jul. 4, 2019

(65) Prior Publication Data
US 2021/0054273 A1    Feb. 25, 2021

(30) Foreign Application Priority Data
Dec. 28, 2017 (JP) .............. JP2017-253304

(51) Int. Cl.
| | | |
|---|---|---|
| C09K 11/88 | (2006.01) | |
| C01B 19/00 | (2006.01) | |
| C09K 11/08 | (2006.01) | |
| C09K 11/70 | (2006.01) | |
| B82Y 20/00 | (2011.01) | |
| B82Y 40/00 | (2011.01) | |

(52) U.S. Cl.
CPC .......... *C09K 11/883* (2013.01); *C01B 19/002* (2013.01); *C09K 11/0883* (2013.01); *C09K 11/703* (2013.01); *B82Y 20/00* (2013.01); *B82Y 40/00* (2013.01); *C01P 2004/64* (2013.01); *C01P 2004/80* (2013.01)

(58) Field of Classification Search
CPC . C09K 11/0883; C09K 11/882; C09K 11/703; B82Y 20/00; C01P 2004/64; C01P 2004/80
See application file for complete search history.

(56) References Cited

U.S. PATENT DOCUMENTS

| | | | |
|---|---|---|---|
| 8,221,651 B2 | 7/2012 | Murase et al. | |
| 9,334,440 B2 | 5/2016 | Jang et al. | |
| 10,975,299 B2 * | 4/2021 | Kim | H01L 51/5056 |
| 11,091,690 B2 * | 8/2021 | Kwon | C09K 11/025 |
| 2015/0083969 A1 | 3/2015 | Kim et al. | |
| 2017/0179338 A1 | 6/2017 | Park et al. | |
| 2017/0306227 A1 | 10/2017 | Ippen et al. | |

FOREIGN PATENT DOCUMENTS

| | | |
|---|---|---|
| CN | 106701059 A | 5/2017 |
| EP | 3184603 A1 | 6/2017 |
| JP | 2016517454 A | 6/2016 |
| KR | 20110091361 A | 8/2011 |
| WO | 2017188300 A1 | 11/2017 |

OTHER PUBLICATIONS

Xu S. et al., "Rapid synthesis of highly luminescent InP and InP/ZnS nanocrystals," Journal of Materials Chemistry, May 16, 2008, 4 pages.
Clayden N. et al., "Optical and Surface Characteristaion of Capping Ligands in the PReparation of InP/ZnS Quantum Dots," Science of Advanced Materials, Jul. 2009, 14 pages.
Buffard A. et al., "Mechanistic Insight and Optimization of InP Nanocrystals Synthesized with Aminophosphines," Chemistry of Materials, Jul. 21, 2016, 10 pages.
Kim S. et al., "Highly Luminescent InP/GaP/ZnS Nanocrystals and Their Application to White Light-Emitting Diodes," Journal of the American Chemical Society, Feb. 3, 2012, 6 pages.
Virieux H et al., "InP/ZnS Nanocrystals: Coupling NMR and XPS for Fine Surface and Interface Description," Journal of the American Chemical Society, Nov. 6, 2012, 8 pages.
Pietra F. et al.,"Tuning the Latice Parameter in InxZnyP for Highly Luminescent Lattice-Matched Core/Shell Quantum Dots," American Chemical Society Nano, Apr. 11, 2016, 9 pages.
Sahoo Y. et al., "Chemically Fabricated Magnetic Quantum of InP:Mn," Journal of Physics and Chemistry, May 23, 2005, 5 pages.
Lim K. et al., "Synthesis of blue emitting InP/ZnS quantum dots through control of competition between etching and growth," Journal of Nanotechnology, Nov. 9, 2012, 8 pages.
Lim J. et al., "InP@ZnSeS, Core@Composition Gradient Shell Quantum Dots with Enhanced Stability," Chemistry of Materials, Sep. 30, 2011, 5 pages.
Mordvinova N. et al., "Highly luminescent core-shell InP/ZnX (X=S, Se) quantum dots prepared via a phosphine synthetic route," Royal Society of Chemistry, Dec. 14, 2016, 7 pages.

(Continued)

*Primary Examiner* — C Melissa Koslow
(74) *Attorney, Agent, or Firm* — Alleman Hall Creasman & Tuttle LLP

(57) ABSTRACT

An object of the present invention is to provide semiconductor nanoparticles having high quantum efficiency (QY) and a narrow full width at half maximum (FWHM). Semiconductor nanoparticles according to an embodiment of the present invention are semiconductor nanoparticles including at least, In, P, Zn and S, wherein the semiconductor nanoparticles include the components other than In in the following ranges: 0.50 to 0.95 for P, 0.30 to 1.00 for Zn, 0.10 to 0.50 for S, and 0 to 0.30 for halogen, in terms of molar ratio with respect to In.

20 Claims, 4 Drawing Sheets

(56) References Cited

OTHER PUBLICATIONS

Li L. et al., "One-pot Synthesis of Highly Luminescent InP/ZnS Nanocrystals without Precursor Injection," Journal of American Chemical Society, May 25, 2008, 2 pages.
Lucey D. et al., "Monodispersed InP Quantum Dots Prepared by Colloidal Chemistry in a Noncoordinating Solvent," Chemistry Materials, Mar. 4, 2005, 9 pages.
Wang, H. et al., "Cadmium-Free InP/ZnSeS/ZnS Heterostructure-Based Quantum Dot Light-Emitting Diodes with a ZnMgO Electron Transport Layer and a Brightness of Over 10 000 cd m-2" Small, vol. 13, No. 13, Jan. 31, 2017, 7 pages.
European Patent Office, Extended European Search Report Issued in Application No. 18896526.3, dated Sep. 15, 2021, Germany, 9 pages.

\* cited by examiner

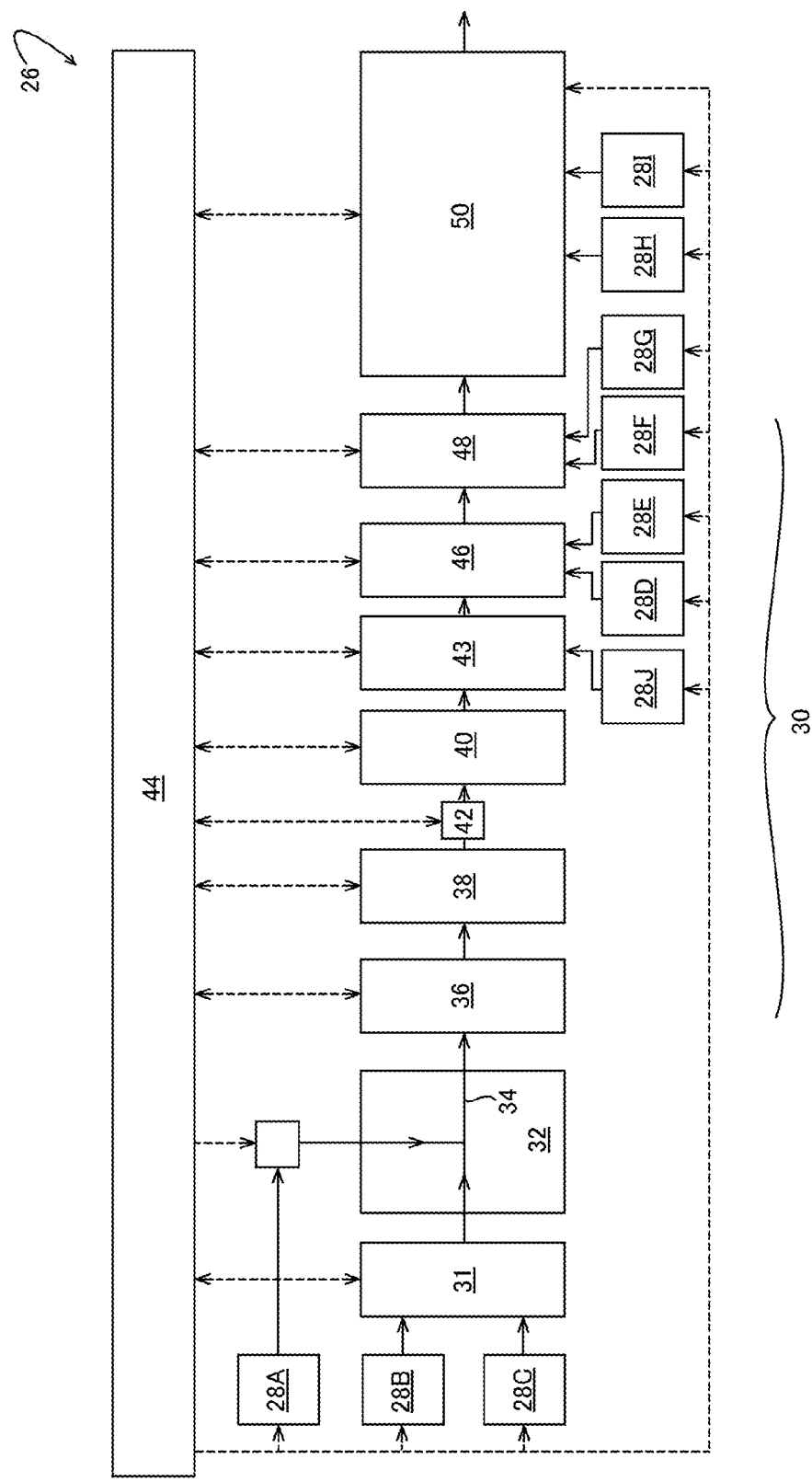

SEMICONDUCTOR NANOPARTICLES AND CORE/SHELL SEMICONDUCTOR NANOPARTICLES

TECHNICAL FIELD

The present invention relates to semiconductor nanoparticles and core/shell semiconductor nanoparticles including the semiconductor nanoparticles as a core.

Priority is claimed on Japanese Patent Application No. 2017-253304, filed Dec. 28, 2017, the content of which is incorporated herein by reference.

BACKGROUND ART

Semiconductor nanoparticles that are microscopic to the extent that they exhibit a quantum confinement effect have a band gap that depends on the particle diameter. Since excitons in semiconductor nanoparticles formed by photoexcitation, a charge injection method or the like emit photons with an energy corresponding to a band gap due to recombination, when the composition and the particle diameter of the semiconductor nanoparticles are appropriately selected, light with a desired wavelength is emitted.

The full width at half maximum (FWHM) of light emission mainly depends on the particle size distribution and the color purity can be increased when particles with a uniform particle diameter are prepared. These properties are used for color displays, lighting, security inks, and the like.

For emission of visible light, Cd chalcogenide semiconductor nanoparticles or InP-based semiconductor nanoparticles are used. InP-based semiconductor nanoparticles are beneficial because they do not contain harmful Cd, but their quantum efficiency (QY) and FWHM are generally inferior to those based on Cd.

CITATION LIST

Patent Literature

Patent Literature 1: U.S. Patent Application Publication No. 2015/0083969
Patent Literature 2: U.S. Pat. No. 9,334,440
Patent Literature 3: U.S. Pat. No. 8,221,651
Patent Literature 4: U.S. Patent Application Publication No. 2017/0179338

Non-Patent Literature

Non-Patent Literature 1: Sungwoo Kim, et al, J. Am. Chem. Soc. 2012, 134, 3804-3809, "Highly Luminescent InP/GaP/ZnS Nanocrystals and Their Application to White Light-Emitting Diodes"
Non-Patent Literature 2: Heloise Virieux, et al, J. Am. Chem. Soc. 2012, 134, 19701-19708, "InP/ZnS Nanocrystals: Coupling NMR and XPS for Fine Surface and Interface Description"
Non-Patent Literature 3: Shu Xu, et al, J. Mater. Chem., 2008, 18, 2653-2656, "Rapid synthesis of highly luminescent InP and InP/ZnS nanocrystals"
Non-Patent Literature 4: Liang Li, et al., J. AM. CHEM. SOC. 2008, 130, 11588-11589, "One-pot Synthesis of Highly Luminescent InP/ZnS Nanocrystals without Precursor Injection"
Non-Patent Literature 5: Aude Buffard, et al, Chem. Mater., 2016, 28(16), pp 5925-5934, "Mechanistic Insight and Optimization of InP Nanocrystals Synthesized with Aminophosphines"
Non-Patent Literature 6: Jaehoon Lim, et al, Chem. Mater. 2011, 23, 4459-4463, "InP@ZnSeS, Core@Composition Gradient Shell Quantum Dots with Enhanced Stability"
Non-Patent Literature 7: Shu Xu, et al., Sci. Adv. Mater. 1, 125-137, 2009, "Optical and Surface Characterisation of Capping Ligands in the Preparation of InP/ZnS Quantum Dots"
Non-Patent Literature 8: Derrick W., et al., Chem. Mater., 2005, 17 (14), pp 3754-3762, "Monodispersed InP Quantum Dots Prepared by Colloidal Chemistry in a Noncoordinating Solvent"
Non-Patent Literature 9: Natalia Mordvinova, et al., Dalton Trans., 2017, 46, 1297-1303, "Highly luminescent core-shell InP/ZnX (X=S, Se) quantum dots prepared via a phosphine synthetic route"
Non-Patent Literature 10: Francesca Pietra, et al., ACS Nano, 2016, 10 (4), pp 4754-4762, "Tuning the Lattice Parameter of InxZnyP for Highly Luminescent Lattice-Matched Core/Shell Quantum Dots"
Non-Patent Literature 11: Y. Sahoo, et al., J. Phys. Chem. B 2005, 109, 15221-15225, "Chemically Fabricated Magnetic Quantum Dots of InP:Mn"
Non-Patent Literature 12: Kipil Lim, et al., Nanotechnology 23 (2012) 485609 (7pp), "Synthesis of blue emitting InP/ZnS quantum dots through control of competition between etching and growth"

SUMMARY OF INVENTION

Technical Problem

Semiconductor nanoparticles called quantum dots are generally prepared and used for a dispersion in which they are dispersed in a resin or a solvent. Quantum dots have a structure of core/shell semiconductor nanoparticles in which a shell is formed on the surface of semiconductor nanoparticles as a core in many cases. This is because, when core/shell semiconductor nanoparticles are used, it is possible to impart properties such as high weather resistance and improved light confinement effect to the semiconductor nanoparticles.

However, a full width at half maximum (FWHM) of an emission spectrum, an emission wavelength, and a quantum efficiency (QY), which are optical properties of the core/shell semiconductor nanoparticles, largely depend on optical properties of the semiconductor nanoparticles as a core part.

That is, when the quantum efficiency (QY) of the semiconductor nanoparticles as a core is low, even if a shell having a strong light confinement effect is formed on the surface of the core, the quantum efficiency (QY) of the core/shell semiconductor nanoparticles remains low. In addition, when a particle size distribution of the semiconductor nanoparticles as a core is broad, the full width at half maximum (FWHM) of an emission spectrum depending on the particle size distribution of the core/shell semiconductor nanoparticles becomes broad.

Therefore, if semiconductor nanoparticles having high quantum efficiency (QY) and a narrow full width at half maximum (FWHM) are obtained, an appropriate shell is formed on the surface according to an appropriate method, and thus core/shell semiconductor nanoparticles having high quantum efficiency (QY) and a narrow full width at half maximum (FWHM) can be obtained.

Here, an object of the present invention is to provide semiconductor nanoparticles having high quantum efficiency (QY) and a narrow full width at half maximum (FWHM).

Solution to Problem

The inventors conducted extensive studies regarding the composition of semiconductor nanoparticles as a core, and as a result, semiconductor nanoparticles having improved optical properties can be obtained, and consequently, regardless of the composition and structure of the shell, improved optical properties can be obtained using core/shell semiconductor nanoparticles.

Semiconductor nanoparticles according to an aspect of the present invention are semiconductor nanoparticles including at least In, P, Zn and S, wherein the semiconductor nanoparticles include the aforementioned components other than In, in the following ranges:

0.50 o 0.95 for P,
0.51 0.30 to 1.00 for Zn,
0.10 o 0.50 for S, and
0.11 0 to 0.30 for halogen,
in terms of molar ratio with respect to In.

Here, in this application, a range expressed using "to" refers to a range including both end points.

Advantageous Effects of Invention

According to the present invention, it is possible to provide semiconductor nanoparticles having excellent optical properties, and as a result, it is possible to provide excellent optical properties using core/shell semiconductor nanoparticles.

BRIEF DESCRIPTION OF DRAWINGS

FIG. 3 is a diagram schematically showing an example of a continuous flow reaction system that can produce semiconductor nanoparticles and core/shell semiconductor nanoparticles according to an embodiment of the present invention.

DESCRIPTION OF EMBODIMENTS

Figure 1:
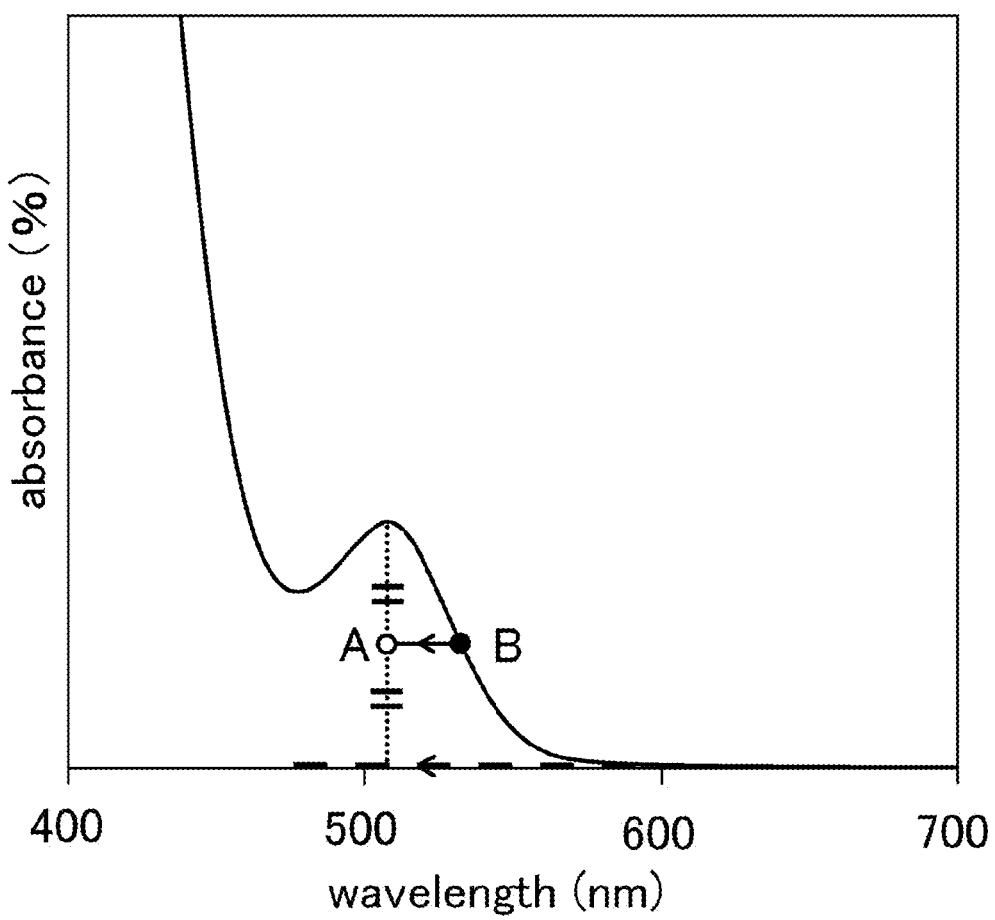
FIG. 1 is a diagram schematically showing an example of an absorption spectrum of semiconductor nanoparticles according to an embodiment of the present invention (InP-based semiconductor nanoparticles).

Semiconductor nanoparticles provided by the present invention are semiconductor nanoparticles including at least In, Zn, P, and S, and preferably including at least one halogen.

(Core)

Hereinafter, examples of synthesizing InP-based semiconductor nanoparticles will be disclosed.

InP-based semiconductor nanoparticles according to an embodiment of the present invention are synthesized in the presence of elemental Zn.

Thereby, InP-based semiconductor nanoparticles with a uniform particle size are obtained. In addition, in the case of core/shell InP-based semiconductor nanoparticles in which InP-based semiconductor nanoparticles serve as a core and a shell is formed on the surface thereof, relatively high quantum efficiency (QY) is obtained. The inventors speculate the reason for this as follows. Elemental Zn inhibits a reaction of a P source or binds to a part that may become a defect part on the surface of a growing InP nano crystal and stabilizes the surface of the particles.

In the semiconductor nanoparticles according to an embodiment of the present invention, when the content of P, in terms of molar ratio with respect to In, is 0.50 to 0.95, an appropriate shell is formed on the surface of the semiconductor nanoparticles, and thus a particularly excellent quantum efficiency can be achieved.

Examples of In precursors include indium carboxylates such as indium acetate, indium propionate, indium myristate and indium oleate, indium halides such as indium fluoride, indium chloride, indium bromide and indium iodide, indium thiolates, and trialkylindium, but the present invention is not limited thereto.

Examples of P precursors include tris(trimethylsilyl)phosphine, tris(trimethylgermyl)phosphine, tris(dimethylamino)phosphine, tris(diethylamino)phosphine, tris(dioctylamino)phosphine, trialkylphosphines and $PH_3$ gas, but the present invention is not limited thereto.

When tris(trimethylsilyl)phosphine as a P precursor is used, elemental Si may be incorporated into the composition of the semiconductor nanoparticles, but it does not impair the actions of the present invention. Here, in addition, in the present invention, as long as the actions and effects of the present invention are not impaired, semiconductor nanoparticles may inevitably or intentionally contain elements other than In, P, Zn and S, and for example, may contain elements such as Si and Ge. In the semiconductor nanoparticles, a total content of elements other than In, P, Zn and S, in terms of molar ratio with respect to In, may be 0.001 to 0.40.

Examples of Zn precursors include zinc carboxylates such as zinc acetate, zinc propionate, zinc myristate and zinc oleate, zinc halides such as zinc fluoride, zinc chloride, zinc bromide and zinc iodide, zinc thiolates, and dialkyl zinc, but the present invention is not limited thereto. The content of Zn in the semiconductor nanoparticles, in terms of molar ratio with respect to In, may be 0.30 to 1.00 and more preferably 0.60 to 0.90.

The In precursor, the Zn precursor, and a solvent are mixed to prepare a metal precursor solution. As necessary, a dispersant exemplified later can be added to the metal precursor solution. The dispersant is positioned on the surface of nanoparticles and has a function of preventing particles from aggregating and stably dispersing them in a solvent. Here, when the metal precursor contains one having a long carbon chain, since it acts as a dispersant, it is not always necessary to add a dispersant in that case.

Examples of dispersants include carboxylic acids, amines, thiols, phosphines, phosphine oxides, phosphinic acids, and phosphonic acids, but the present invention is not limited thereto. The dispersant can also serve as a solvent.

Examples of solvents include 1-octadecene, hexadecane, squalane, oleylamine, trioctylphosphine, and trioctylphosphine oxide, but the present invention is not limited thereto.

An S source is additionally added when InP-based semiconductor nanoparticles are synthesized. When the core particles contain a specific amount of S, a size distribution of the InP-based semiconductor nanoparticles can be further narrowed.

Examples of S sources include trioctyl phosphine sulfide, tributylphosphine sulfide, thiols and bis(trimethylsilyl)sulfide, but the present invention is not limited thereto. The content of S in the semiconductor nanoparticles, in terms of molar ratio with respect to In, may be 0.10 to 0.50 and more preferably 0.20 to 0.50.

The elements Zn and S used here may be incorporated into the semiconductor nanoparticles or may be present only on the surface of the particles.

In one embodiment, a metal precursor solution is including an In precursor, a Zn precursor, an S precursor, and a dispersant is added to a solvent as necessary are mixed under a vacuum, the metal precursor solution is first heated at 100° C. to 300° C. for 6 to 24 hours, and a P precursor is then additionally added thereto, the mixture is heated at 200° C. to 400° C. for 3 to 60 minutes and then cooled to obtain a dispersion containing InP semiconductor nanoparticles.

In the conventional technologies (Patent Literature 1 to 4, and Non-Patent Literature 1 to 12), no Zn precursor or S precursor is added when semiconductor nanoparticles are formed, or even if they are added, since the composition is outside the range of the present invention, semiconductor nanoparticles having poorer optical properties than those of the present invention are obtained.

(Halogen)

In the present invention, in the case where InP-based semiconductor nanoparticles are additionally acted upon by a halogen precursor to provide core/shell InP-based semiconductor nanoparticles in which the InP-based semiconductor nanoparticles serve as a core, and a shell is formed on the surface thereof, relatively high quantum efficiency (QY) is obtained.

The inventors speculate the reason for this as follows. When a halogen is added, it links between $In^{3+}$ and $Zn^{2+}$ and fills a dangling bond, and has an effect of improving an effect of confining anions to electrons. In addition, the inventors speculate that the halogen provides high quantum efficiency (QY) and has an effect of minimizing aggregation of core particles.

When the semiconductor nanoparticles according to an embodiment of the present invention contain a halogen, the content of the halogen in the semiconductor nanoparticles, in terms of molar ratio with respect to In, is preferably 0.03 to 0.30 and more preferably 0.10 to 0.30.

At least one halogen is selected. When two or more halogens are selected, a total amount of halogen in the semiconductor nanoparticles may be the above molar ratio with respect to In.

Examples of halogen precursors include HF, HCl, HBr, HI, carboxylic acid halides such as oleoyl chloride and octanoyl chloride, and metal halides such as zinc chloride, indium chloride and gallium chloride, but the present invention is not limited thereto.

A halogen in the form of indium halide or zinc halide can be added as the In or Zn precursor described above at the same time.

The halogen precursor may be added before or after InP-based semiconductor nanoparticles are synthesized or for example, it may be added to the InP-based semiconductor nanoparticle dispersion during synthesis.

In one embodiment, a halogen precursor is added to the InP-based semiconductor nanoparticle dispersion, and a heat treatment is performed at 25° C. to 300° C., preferably 100° C. to 300° C., and more preferably 170° C. to 280° C. for 5 minutes to 360 minutes, and thereby an InP-based semiconductor nanoparticle dispersion with added halogen is obtained.

(Measurement: Semiconductor Nanoparticles [Core])

Elemental analysis of the InP-based semiconductor nanoparticles obtained in this manner is performed using a high frequency inductively coupled plasma emission spectrometer (ICP) and an X-ray fluorescence analysis device (XRF). In ICP measurement, the purified semiconductor nanoparticles are dissolved in nitric acid and heated, and then diluted in water, and measurement is performed using an ICP emission analysis device (ICPS-81000 commercially available from Shimadzu Corporation) according to a calibration curve method. In XRF measurement, a filter paper impregnated with the dispersion is put into a sample holder, and quantitative analysis is performed using an X-ray fluorescence analysis device (ZSX100e commercially available from Rigaku Corporation).

Optical properties of the InP-based semiconductor nanoparticles can be measured using a UV visible infrared spectrophotometer (V-570 commercially available from JASCO Corporation). The obtained InP-based semiconductor nanoparticles are dispersed in a dispersion, and an absorption peak wavelength and a full width at half maximum (Abs. FWHM) are calculated from the absorption spectrum obtained by applying ultraviolet to visible light. Examples of dispersions include N-hexane and octadecene.

FIG. 1 shows an absorption spectrum of InP-based semiconductor nanoparticles according to an embodiment.

The maximum value of the absorption spectrum is used as an absorption peak wavelength. The full width at half maximum (Abs. FWHM) of the absorption spectrum is calculated as follows.

The base line of the spectrum on the longer wavelength side with respect to the peak wavelength of the absorption spectrum is set as a base line (broken line in FIG. 1), and a midpoint between the intersection between a line (dotted line in FIG. 1) drawn from the maximum value of the absorption spectrum downward to the base line and the base line and the maximum value of the absorption spectrum (point A, white circle in FIG. 1) is obtained. A line that passes through the point A and is parallel to the base line is drawn and a distance A-B (solid straight line in FIG. 1) between the intersection (point B, black circle in FIG. 1) on the longer wavelength side of the absorption spectrum and A is doubled, and the doubled value is calculated as the full width at half maximum (Abs. FWHM) of the absorption spectrum.

The full width at half maximum (Abs. FWHM) of the absorption peak wavelength depends on the particle size distribution of the InP-based semiconductor nanoparticles, and a narrower full width at half maximum (Abs. FWHM) of the absorption peak indicates that InP-based semiconductor nanoparticles with a more uniform particle size are obtained. The full width at half maximum (Abs. FWHM) of the absorption peak is preferably 60 nm or less, and more preferably 50 nm or less.

In addition, in the present invention, when a core/shell structure in which the above semiconductor nanoparticles serve as a core and which includes a shell covering at least a part of the surface is provided, further improved optical properties can be obtained. For example, in response to the required properties, when an appropriate shell is formed on the InP-based semiconductor nanoparticles, core/shell semiconductor nanoparticles having a narrow full width at half maximum of the emission spectrum can be obtained. A method of measuring an emission spectrum of core/shell semiconductor nanoparticles will be described below, but the full width at half maximum of the emission spectrum is preferably 40 nm or less.

In addition, similarly, when an appropriate shell is formed on InP-based semiconductor nanoparticles, a light confinement effect can be imparted to the semiconductor nanoparticles, and core/shell semiconductor nanoparticles having high quantum efficiency (QY) are obtained. The quantum efficiency (QY) of the core/shell semiconductor nanoparticles is preferably 70% or more, and more preferably 80% or more. This is about the same value as the quantum efficiency (QY) of conventional CdS-based semiconductor nanoparticles.

Here, although not particularly limited, the particle diameter of the core/shell semiconductor nanoparticles of the present invention is preferably 1 nm to 20 nm and more preferably 1 nm to 10 nm. Regarding the distribution, when the particle size distribution has a normal distribution, a distribution in which the peak particle diameter is within ±3 nm is preferably used.

FIG. 2A to FIG. 2E show examples of embodiments of core/shell semiconductor nanoparticles.

Figure 2A:
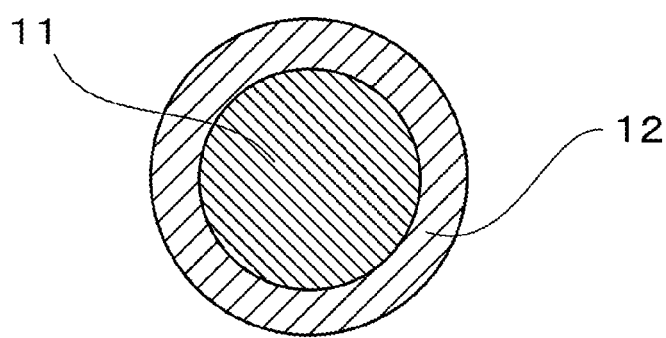
FIG. 2A is a diagram schematically showing an example of a form of semiconductor nanoparticles according to an embodiment of the present invention.
Figure 2B:
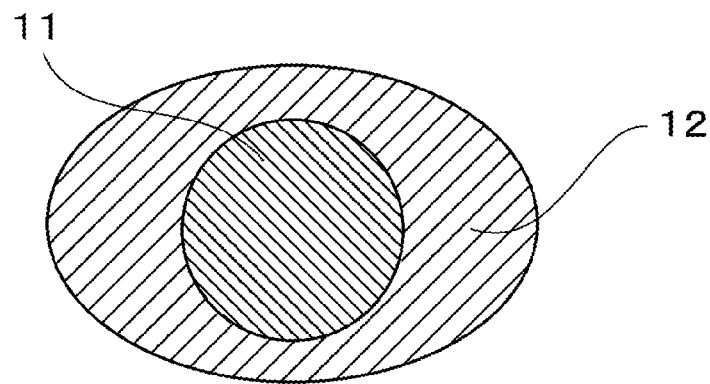
FIG. 2B is a diagram schematically showing an example of a form of semiconductor nanoparticles according to an embodiment of the present invention.
Figure 2C:
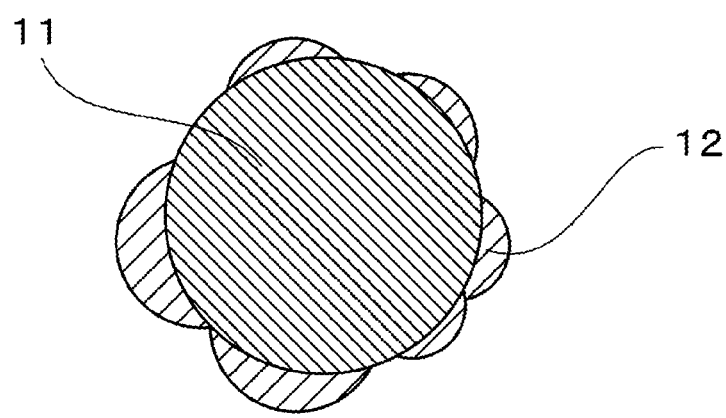
FIG. 2C is a diagram schematically showing an example of a form of semiconductor nanoparticles according to an embodiment of the present invention.
Figure 2D:
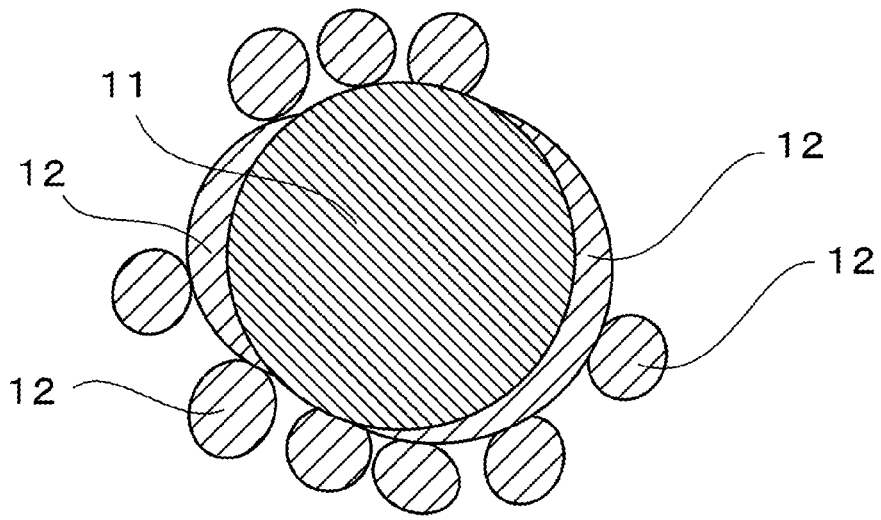
FIG. 2D is a diagram schematically showing an example of a form of semiconductor nanoparticles according to an embodiment of the present invention.
Figure 2E:
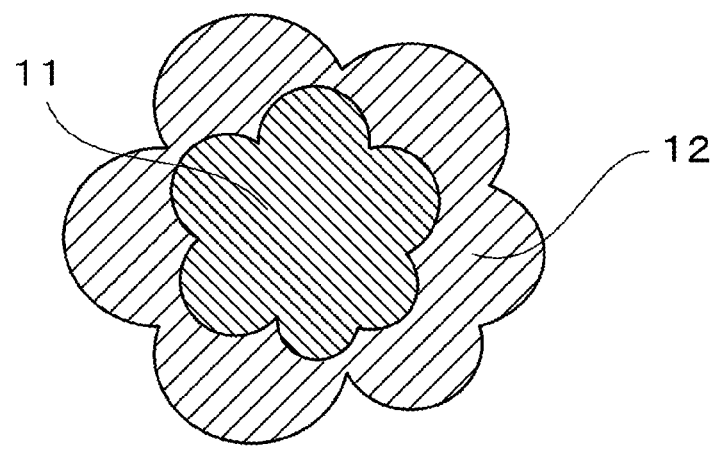
FIG. 2E is a diagram schematically showing an example of a form of semiconductor nanoparticles according to an embodiment of the present invention.

The embodiments shown in FIG. 2A to FIG. 2E are composed of a core 11 and a shell 12, the core is mainly composed of In, Zn, P, and S, and additionally preferably a halogen, and the shell is composed of an element selected from Group IIB, Group IIIB, Group VB, and Group VIB elements. In one embodiment, in core/shell semiconductor nanoparticles shown in FIG. 2A and FIG. 2B, preferably, the shell covers the entire surface of the core, and additionally, as shown in FIG. 2A, preferably, the shell uniformly covers the entire surface of the core. However, the present invention is not limited thereto, for example, as shown in FIG. 2C, core/shell semiconductor nanoparticles in which the shell is provided in an island shape on a part of the surface of the core may be used. In still another embodiment, as shown in FIG. 2D, core/shell semiconductor nanoparticles in which the shell as nanoparticles is attached to the surface of the core and covers the core may be used. In yet another embodiment, as shown in FIG. 2E, core/shell semiconductor nanoparticles having a non-spherical core may be used.

The structure of the core/shell semiconductor nanoparticles of the present invention can be confirmed by detecting elements constituting the core and the shell and their concentration change using a scanning transmission electron microscope (STEM) through energy dispersive X-ray spectrometry (EDS).

(Shell)

When a shell containing any one or more elements selected from the group consisting of Group IIB, Group IIIB, Group VB, and Group VIB elements is formed on the surface of the above InP-based semiconductor nanoparticles, it is possible to improve the quantum efficiency (QY) and additionally, it is possible to protect semiconductor nanoparticles from external influences and improve stability.

Here, Group IIB elements include Zn, Cd, and Hg, Group IIIB elements include B, Al, Ga, In, and Tl, Group VB elements include N, P, As, Sb, and Bi, and Group VIB elements include O, S, Se, Te, and Po.

These elements allow the surface of the semiconductor nanoparticles to have mainly a single composition of Group IIIB-VB or Group IIB-VIB elements, a complex compound, or a hetero structure, or an amorphous structure. Here, a part of the shell can move into the core particles by diffusion.

Examples of precursors of elements added when a shell is formed include carboxylates such as acetates, propionates, myristates and oleates, halides such as fluorides, chlorides, bromides and iodides, and organic compounds such as an alkyl salt, but the present invention is not limited thereto. In addition, when an element added when a shell is formed is the same as an element added when a core is prepared, the precursor may be the same as the precursor as in the element source added when the core is synthesized or may be a different precursor.

Preferably, the shell is composed of a Group IIIB-VB compound containing at least, one or more elements selected from Group IIIB elements and one or more elements selected from Group VB elements, or a Group IIB-VIB compound containing at least, one or more elements selected from Group IIB elements and one or more elements selected from Group VIB elements.

Examples of Group IIB-VIB compounds include ZnS, ZnSe, ZnTe, CdS, CdSe, CdTe, ZnSeS, ZnSeTe, ZnTeS, CdSeS, CdSeTe, CdTeS, ZnCdS, ZnCdSe, ZnCdTe, ZnCdSeS, ZnCdTeSe and ZnCdHgSeTeS.

In addition, examples of Group IIIB-VB compounds include GaN, GaP, GaAs, GaSb, GaBi, InN, InP, InAs, InSb, InBi, AlN, AlP, AlAs, AlSb, InGaN, InGaP, GaInAs, GaInSb, InGaBi, GaAlN, GaAlP, GaAlAs, GaAlSb, GaAlBi, InAlN, InAlP, InAlAs, InAlSb, InAlBi, GaNP, InNP, AlNP, GaNAs, InNAs, AlNAs, GaNSb, InNSb, AlNSb, GaNBi, InNBi, AlNBi, GaPAs, InPAs, AlPAs, InPSb, GaAsSb, InAsSb, AlAsSb, TlAsSb, InGaNP, GaAlNP, GaTlNP and InAlNP. The compositional ratio of the compounds exemplified here need not necessarily be stoichiometric ratios in actual embodiments.

In one embodiment, a Zn precursor and a Se precursor are added to InP semiconductor nanoparticles as precursors of the shell, and heating is performed at 150° C. to 400° C., preferably 200° C. to 350° C., and the shell is formed on the surface of the semiconductor nanoparticles. The precursors may be mixed in advance and added at once or in several portions or may be added separately at once or in several portions. When the precursors of the shell are added in a plurality of steps, heating may be performed by changing the temperature after each precursor of the shell is added.

In the present invention, the shell is not limited to a single layer and for example, it may have a multi-layer structure having a plurality of shells composed of compounds having different compositions such as a core/shell/shell type. The compound constituting the shell can be arbitrarily selected from the above Group IIIB-VB compounds and Group IIB-VIB compounds. The shell can have a multi-layer structure including any selected from the group consisting of two or more of the above Group IIIB-VB compounds having mutually different compositions, two or more of the above Group IIB-VIB compounds having mutually different compositions, and a combination of the above Group IIIB-VB compounds and the above Group IIB-VIB compounds. In addition, in the shell, at least one of a number of one or more elements selected from the above Group IIIB elements, a number of one or more elements selected from the above Group VB elements, a number of one or more elements selected from the above Group IIB elements, and a number of one or more elements selected from the above Group VIB elements may be more than one.

The inventors speculate that such a configuration can provide effects of filling dangling bonds of the core and the shell, and adjusting lattice mismatch between the core and the shell, and the like.

In one embodiment, a Zn precursor and a Se precursor as first layer shell precursors are added to InP-based semiconductor nanoparticles, and then heated, and a Zn precursor and an S precursor as second layer shell precursors are then added and then heated, and thereby core/shell semiconductor nanoparticles having a multi-layer structure shell can be obtained.

The precursors of the shell may be mixed in advance and added at once or in several portions or may be added separately at once or in several portions. When the precursors of the shell are added in a plurality of steps, heating may be performed by changing the temperature after each precursor of the shell is added.

In addition, the shell may have a structure in which the concentration of at least one of the elements constituting the shell changes in the thickness direction of the shell. In such a structure, the change in the lattice constant inside the shell becomes gentle and the number of lattice defects in the shell can be reduced.

In one embodiment, a Zn precursor and a Se precursor are added to InP-based semiconductor nanoparticles and then heated, and the Zn precursor and the Se precursor of which a ratio therebetween changes are additionally added and then heated. Accordingly, a shell having a structure in which the concentration of at least one of the elements constituting the shell changes in the thickness direction of the shell can be obtained. In this case, the precursors in each of stages may be mixed in advance and added at once or in several portions, or may be added separately at once or in several portions.

Other examples of such a structure include, in addition to the above combination of Zn-Se, include, for example, combinations of Group IIB-VIB elements such as Zn—S, Zn—Te, Cd—S, Cd—Se and Cd-Te, and for example, combinations of Group IIIB-VB elements such as Ga—N, Ga—P, Ga—As, Ga—Sb, Ga—Bi, In—N, In—P, In—As, In—Sb, In—Bi and Al-N.

In still another embodiment, a Zn precursor and a Se precursor are added to InP-based semiconductor nanoparticles and then heated, subsequently the Zn precursor, the Se precursor, and the S precursor are added and then heated, and additionally, subsequently the Zn precursor and the S precursor are added and then heated.

In this case, the precursors in each of stages may be mixed in advance and added at once or in several portions or may be added separately at once or in several portions.

Other examples of such a structure include, in addition to the above Zn—Se—S, for example, combinations of Group IIB-VIB compounds such as Zn—Se—Te, Zn—Te—S, Cd—Se—S, Cd—Se—Te, Cd—Te—S, Zn—Cd—S, Zn—Cd—Se, Zn—Cd—Te and Zn—Cd—Se—S, and for example, combinations of Group IIIB-VB compounds such as In—Ga—N, In—Ga—P, Ga—In—As, Ga—Al—N, Ga—Al—P, In—Al—P and In—Ga—N—P.

In addition, at least one or more layers of the above multi-layer structure may have a structure in which the concentration of an element changes in the thickness direction of the shell.

The core/shell semiconductor nanoparticles obtained in this manner can be further purified. In one example, when a polarity changing solvent such as acetone is added, core/shell semiconductor nanoparticles can be precipitated from the solution. Solid core/shell semiconductor nanoparticles can be collected through filtration or centrifugation. On the other hand, a supernatant containing unreacted starting material and other impurities can be discarded or reused. Then, the solid can be washed with an additional solvent, and dissolved again. This purifying process can be repeated, for example, 2 to 4 times or until a desired purity is obtained. Examples of other purification methods include aggregation, liquid-liquid extraction, distillation, electrodeposition, size exclusion chromatography and/or ultrafiltration, and any or all of the above purification methods can be used alone or in combination.

(Ligand)

In order for core/shell semiconductor nanoparticles to be stably dispersed in a matrix, the surface of the shell may be modified with a ligand. In addition, as necessary, the ligand may be replaced, and core/shell semiconductor nanoparticles be dispersed in a solvent with a different polarity, and the core/shell semiconductor nanoparticles can be bonded to another structure with the ligand.

An amount of the ligand may be added so that the entire surface of the core/shell semiconductor nanoparticles is covered.

In addition, regarding the ligand, carboxylic acids, alkyl phosphines, alkyl thiols, and the like can be used. Particularly, those having a thiol group are suitable because they can strongly bind to and stably cover the surface of semiconductor nanoparticles.

(Process)

In one embodiment, the above process can be performed in a batch process. In addition, in another embodiment, at least a part of the above process can be performed in a continuous flow process, for example, such as those described in International Patent Publications WO2016/194802, WO2017/014314, and WO2017/014313, and International Application No. PCT/JP2017/016494.

Hereinafter, a method of preparing semiconductor nanoparticles will be described based on the continuous flow process described in International Application No. PCT/JP2017/016494.

FIG. 2 shows a form of an example of a continuous flow reaction system 26. The continuous flow reaction system includes a plurality of fluid sources 28 (fluid source 28A to fluid source 28J). These may include, for example, a compressed gas cylinder, a pump, and/or a liquid reservoir. The continuous flow reaction system includes a plurality of reaction device 30 and a segmentation device 32. In the shown example, the fluid sources 28B and 28C can include, for example, an In source and a P source. Although not shown, the each fluid sources 28 can include one or a plurality of fluid sources depending on the type of the precursor solution, and further include a fluid source containing a Zn source and an S source. In this case, a precursor mixing device 31 may or may not be provided before the segmentation device. When there is no mixing device, a plurality of fluid sources are mixed in the segmentation device.

The continuous flow reaction system 26 includes a reaction mixture flow path, and the flow path includes a main pipeline 34 through which a plurality of reaction devices 30 pass. The fluid source 28A is a non-reactive fluid (for example, a relatively inert gas such as nitrogen, argon, or helium) supply source, and in the segmentation device 32, the non-reactive fluid is introduced into the flow path from the fluid source 28A, and a reaction mixture segment flow is formed. This segment flow results in a narrower retention time distribution in the downstream reaction device than that without segmentation. The precursor mixing device 31 and the segmentation device 32 communicate with a process controller 44, control mixing of a plurality of fluid sources (for example, a stirring speed), and control the amount of the non-reactive fluid introduced.

The segmented reaction mixture and immiscible fluid are sent to an energy application activation stage 36 from the segmentation device 32, and energy is quickly applied to the mixture here using an energy source, for example, a single mode, a multimode, or a variable frequency microwave source, a light source such as a high energy lamp or a laser, a high temperature heating (for example, resistance heating) device, a sonic processing device, or any suitable combination of energy sources. Here, the semiconductor nanoparticles are quickly and uniformly nucleated. Then, a flow of the formed nuclei and precursors is sent to an incubation stage 38, and here, a heat source promotes growth of the nucleated precursors of a nanocrystalline core material under continuous flow conditions. In the process, quenching is performed in the collection stage 40, and here, a solution containing semiconductor nanoparticles can be optionally separated from an immiscible non-reactive fluid. In another embodiment, since nucleation and growth can be performed in the same reaction stage, the energy application activation stage 36 can be omitted.

In the example in FIG. 3, an analysis device 42 is arranged fluidly upstream from the collection stage 40. In the analysis device, one or more physical properties of the semiconductor nanoparticles exiting the incubation stage 38 can be examined and analyzed. In one example, the analysis device can communicate with the process controller 44. The process controller includes an electron control device that is linked so that various inputs of the fluid sources 28 and the reaction device 30 can be operated. Examples of such inputs include an energy flow rate in the energy application activation stage 36, heating of the incubation stage 38, and various flow control components arranged throughout the continuous flow reaction system 26. A closed loop feedback based on one or more properties analyzed in the analysis device can be used to automatically optimize or adjust the size, composition, and/or other properties of the semiconductor nanoparticles.

In FIG. 3, subsequently, the continuous flow reaction system 26 includes a halogen treatment stage 43 fluidly downstream from the collection stage 40, an intermediate shell production stage 46 fluidly downstream from the halogen treatment stage 43, and an external shell production stage 48 fluidly downstream from the intermediate shell production stage 46. The fluid source 28J connected to the halogen treatment stage 43 can contain a halogen precursor. The fluid sources 28D and 28E connected to the intermediate shell production stage 46 can contain, for example, a Zn precursor and a Se precursor source, respectively. The fluid sources 28F and 28G connected to the external shell production stage 48 can contain, for example, a Zn precursor and an S precursor source, respectively. The number of fluid sources connected to each stage is not limited to that shown in FIG. 3 and one or a plurality of fluid sources can be provided depending on the type of precursor. In addition, the halogen treatment stage 43, the intermediate shell production stage 46 and the external shell production stage 48 need not necessarily be divided into stages, but may be combined in one stage as necessary, or may be divided into more detailed stages. In addition, when the stages are divided, a fluid source may or may not be provided in each stage.

The continuous flow reaction system 26 in FIG. 3 also includes a purification stage 50 arranged downstream from the external shell production stage 48. The fluid sources 28H and 28I connected to the purification stage 50 can contain solvents, for example, acetone and octadecene, respectively. The number of fluid sources connected to the purification stage 50 is not limited to that shown in FIG. 3 and one or a plurality of fluid sources can be provided depending on the type of solvent required. Since various methods of purifying semiconductor nanoparticles are within the spirit and scope of this disclosure, the structure and function of the purification stage 50 of this disclosure may be different from those in other embodiments. Examples of such a method include aggregation, liquid-liquid extraction, distillation and removal of impurities through electrodeposition, and any or all of the above purification methods can be used in combination. However, in one embodiment, one method may be used and the other methods may be excluded.

(Measurement)

The optical properties of the core/shell semiconductor nanoparticles obtained in this manner can be measured using a quantum efficiency measurement system (QE-2100 commercially available from Otsuka Electronics Co., Ltd.). The obtained semiconductor nanoparticles are dispersed in a dispersion, excitation light is applied to obtain an emission spectrum, and the quantum efficiency (QY) and the full width at half maximum (FWHM) are calculated from the emission spectrum after re-excitation correction obtained by excluding the amount of the re-excitation fluorescence emission spectrum of re-excitation fluorescence emission from the emission spectrum obtained here. Examples of dispersions include N-hexane and octadecene.

(Equivalents)

It can be understood that components and/or methods described in this specification are shown as examples, numerous modifications are possible, and thus these specific examples or examples should not be considered as limitations. Specific procedures or methods described in this specification may show one of a plurality of processing methods. Therefore, various operations explained and/or described may be performed in the order explained and/or described or may be omitted. Similarly, the order of the above methods can be changed.

The subject of this disclosure includes various methods, systems and components disclosed herein and novel and non-obvious combinations and subcombinations of other features, functions, operations, and/or properties, and all equivalents thereof.

EXAMPLES

[Preparation of InP-Based Semiconductor Nanoparticles]

According to the following method, InP-based semiconductor nanoparticles were prepared, and the composition and absorption spectrum characteristics of the InP-based semiconductor nanoparticles were measured.

Example 1

Indium acetate (0.30 mmol) and zinc oleate (0.54 mmol) were added to a mixture containing oleic acid (0.90 mmol), 1-dodecanethiol (0.11 mmol), and octadecene (10 mL), and the mixture was heated at about 110° C. under a vacuum (<20 Pa), and reacted for 15 hours. The mixture reacted in a vacuum was left at 25° C. under a nitrogen atmosphere, tris(trimethylsilyl)phosphine (0.20 mmol) was added thereto, and the mixture was then heated at about 300° C. and reacted for 10 minutes. The reaction solution was cooled to 25° C., octanoic acid chloride (0.53 mmol) was injected, the mixture was heated at about 250° C. for 30 minutes, cooling was then performed at 25° C., and thereby an InP-based semiconductor nanoparticle dispersion solution was obtained.

Example 2

An InP-based semiconductor nanoparticle dispersion solution was obtained in the same procedure as in Example 1 except that 0.63 mmol of zinc oleate was used.

Example 3

An InP-based semiconductor nanoparticle dispersion solution was obtained in the same procedure as in Example 1 except that 0.72 mmol of zinc oleate was used.

Example 4

An InP-based semiconductor nanoparticle dispersion solution was obtained in the same procedure as in Example 1 except that 0.81 mmol of zinc oleate was used.

Example 5

An InP-based semiconductor nanoparticle dispersion solution was obtained in the same procedure as in Example 1 except that 0.15 mmol of dodecane thiol was used.

Example 6

An InP-based semiconductor nanoparticle dispersion solution was obtained in the same procedure as in Example 1 except that 0.63 mmol of zinc oleate, 0.15 mmol of dodecane thiol, and 0.24 mmol of tris(trimethylsilyl)phosphine were used.

Example 7

An InP-based semiconductor nanoparticle dispersion solution was obtained in the same procedure as in Example 1 except that 0.81 mmol of zinc oleate and 0.15 mmol of dodecane thiol were used.

Example 8

An InP-based semiconductor nanoparticle dispersion solution was obtained in the same procedure as in Example 1 except that 0.15 mmol of dodecane thiol and 0.18 mmol of tris(trimethylsilyl)phosphine were used.

Example 9

An InP-based semiconductor nanoparticle dispersion solution was obtained in the same procedure as in Example 1 except that 0.63 mmol of zinc oleate, 0.15 mmol of dodecane thiol, and 0.18 mmol of tris(trimethylsilyl)phosphine were used.

Example 10

An InP-based semiconductor nanoparticle dispersion solution was obtained in the same procedure as in Example 1 except that 0.72 mmol of zinc oleate, 0.15 mmol of dodecane thiol, and 0.18 mmol of tris(trimethylsilyl)phosphine were used.

Example 11

An InP-based semiconductor nanoparticle dispersion solution was obtained in the same procedure as in Example 1 except that 0.81 mmol of zinc oleate, 0.15 mmol of dodecane thiol, and 0.15 mmol of tris(trimethylsilyl)phosphine were used.

Example 12

An InP-based semiconductor nanoparticle dispersion solution was obtained in the same procedure as in Example 1 except that 0.15 mmol of dodecane thiol, 0.24 mmol of tris(trimethylsilyl)phosphine, and 0.25 mmol of octanoic acid chloride were used.

Example 13

An InP-based semiconductor nanoparticle dispersion solution was obtained in the same procedure as in Example 1 except that 0.72 mmol of zinc oleate, 0.15 mmol of dodecane thiol, and 0 mmol of octanoic acid chloride were used.

Example 14

An InP-based semiconductor nanoparticle dispersion solution was obtained in the same procedure as in Example 1 except that 0.81 mmol of zinc oleate, 0.15 mmol of dodecane thiol, and 0 mmol of octanoic acid chloride were used.

Example 15

An InP-based semiconductor nanoparticle dispersion solution was obtained in the same procedure as in Example 1 except that 0.375 mmol of zinc oleate, 0.07 mmol of dodecane thiol, 0.24 mmol of tris(trimethylsilyl)phosphine, and 0 mmol of octanoic acid chloride were used.

Example 16

An InP-based semiconductor nanoparticle dispersion solution was obtained in the same procedure as in Example 1 except that 0.45 mmol of zinc oleate and 0 mmol of octanoic acid chloride were used.

Example 17

An InP-based semiconductor nanoparticle dispersion solution was obtained in the same procedure as in Example 1 except that 0.81 mmol of zinc oleate and 0 mmol of octanoic acid chloride were used.

Comparative Example 1

An InP-based semiconductor nanoparticle dispersion solution was obtained in the same procedure as in Example 1 except that 0.3 mmol of zinc oleate and 0.15 mmol of dodecane thiol were used.

Comparative Example 2

An InP-based semiconductor nanoparticle dispersion solution was obtained in the same procedure as in Example 1 except that 1.05 mmol of zinc oleate and 0.15 mmol of dodecane thiol were used.

Comparative Example 3

An InP-based semiconductor nanoparticle dispersion solution was obtained in the same procedure as in Example 1 except that 0.63 mmol of zinc oleate and 0.11 mmol of tris(trimethylsilyl)phosphine were used.

Comparative Example 4

An InP-based semiconductor nanoparticle dispersion solution was obtained in the same procedure as in Example 1 except that 0.63 mmol of zinc oleate and 0.45 mmol of tris(trimethylsilyl)phosphine were used.

Comparative Example 5

An InP-based semiconductor nanoparticle dispersion solution was obtained in the same procedure as in Example 1 except that 0.05 mmol of dodecane thiol was used.

Comparative Example 6

An InP-based semiconductor nanoparticle dispersion solution was obtained in the same procedure as in Example 1 except that 0.27 mmol of dodecane thiol was used.

Comparative Example 7

An InP-based semiconductor nanoparticle dispersion solution was obtained in the same procedure as in Example 1 except that 0.13 mmol of dodecane thiol was used.

Comparative Example 8

An InP-based semiconductor nanoparticle dispersion solution was obtained in the same procedure as in Example 1 except that 0 mmol of zinc oleate, 0 mmol of dodecane thiol, and 0 mmol of octanoic acid chloride were used.

Comparative Example 9

An InP-based semiconductor nanoparticle dispersion solution was obtained in the same procedure as in Example 1 except that 0 mmol of dodecane thiol and 0 mmol of octanoic acid chloride were used.

Comparative Example 10

An InP-based semiconductor nanoparticle dispersion solution was obtained in the same procedure as in Example 1 except that 0.09 mmol of zinc oleate, 0.39 mmol of tris(trimethylsilyl)phosphine, and 0 mmol of octanoic acid chloride were used.

Composition analysis was performed on the obtained InP-based semiconductor nanoparticles, and the absorption spectrum thereof was measured.

As described above, the composition analysis was performed by measurement using the high frequency inductively coupled plasma emission spectrometer (ICP) and the X-ray fluorescence analysis device (XRF).

As described above, the absorption spectrum was measured using the UV visible infrared spectrophotometer. A wavelength of light emitted to the sample was 300 nm to 800 nm.

Table 1 shows the composition analysis of the InP-based semiconductor nanoparticles, the absorption wavelength of the absorption spectrum, and the full width at half maximum (Abs. FWHM).

TABLE 1

| | Compositional ratio | | | | Absorption properties | |
|---|---|---|---|---|---|---|
| | [P]/[In] | [Zn]/[In] | [S]/[In] | [Cl]/[In] | Peak [nm] | FWHM [nm] |
| Example 1 | 0.70 | 0.67 | 0.29 | 0.18 | 466 | 54 |
| Example 2 | 0.70 | 0.66 | 0.28 | 0.18 | 462 | 56 |
| Example 3 | 0.68 | 0.60 | 0.24 | 0.17 | 453 | 54 |

TABLE 1-continued

| | Compositional ratio | | | | Absorption properties | |
|---|---|---|---|---|---|---|
| | [P]/[In] | [Zn]/[In] | [S]/[In] | [Cl]/[In] | Peak [nm] | FWHM [nm] |
| Example 4 | 0.68 | 0.61 | 0.24 | 0.17 | 451 | 56 |
| Example 5 | 0.69 | 0.79 | 0.39 | 0.19 | 465 | 54 |
| Example 6 | 0.82 | 0.78 | 0.42 | 0.26 | 465 | 40 |
| Example 7 | 0.67 | 0.88 | 0.39 | 0.21 | 454 | 56 |
| Example 8 | 0.69 | 0.80 | 0.41 | 0.21 | 463 | 56 |
| Example 9 | 0.69 | 0.73 | 0.36 | 0.18 | 455 | 58 |
| Example 10 | 0.68 | 0.74 | 0.36 | 0.19 | 450 | 58 |
| Example 11 | 0.54 | 0.70 | 0.32 | 0.18 | 450 | 50 |
| Example 12 | 0.74 | 0.76 | 0.33 | 0.03 | 427 | 54 |
| Example 13 | 0.77 | 0.67 | 0.33 | 0 | 430 | 52 |
| Example 14 | 0.74 | 0.65 | 0.32 | 0 | 430 | 54 |
| Example 15 | 0.84 | 0.36 | 0.17 | 0 | 430 | 56 |
| Example 16 | 0.74 | 0.42 | 0.25 | 0 | 435 | 54 |
| Example 17 | 0.75 | 0.58 | 0.25 | 0 | 435 | 58 |
| Comparative Example 1 | 0.73 | 0.18 | 0.50 | 0.23 | 486 | 68 |
| Comparative Example 2 | 0.77 | 1.21 | 0.31 | 0.21 | 448 | 64 |
| Comparative Example 3 | 0.42 | 0.81 | 0.26 | 0.12 | 464 | 64 |
| Comparative Example 4 | 0.98 | 0.71 | 0.29 | 0.20 | 465 | 76 |
| Comparative Example 5 | 0.74 | 0.45 | 0.08 | 0.21 | 470 | 66 |
| Comparative Example 6 | 0.72 | 0.88 | 0.66 | 0.25 | 460 | 64 |
| Comparative Example 7 | 0.57 | 0.84 | 0.40 | 0.42 | 461 | 76 |
| Comparative Example 8 | 0.75 | 0.01 | 0 | 0 | 472 | 83 |
| Comparative Example 9 | 0.73 | 0.71 | 0.01 | 0 | 467 | 79 |
| Comparative Example 10 | 0.89 | 0.12 | 0.28 | 0 | 466 | 76 |

[Preparation of Core/Shell Semiconductor Nanoparticles]

The InP-based semiconductor nanoparticles obtained in Examples 1 to 17 and Comparative Examples 1 to 10 were used as cores, shells having the structure shown in Table 2 were formed on the surfaces of the cores to prepare core/shell semiconductor nanoparticles, and the optical properties were measured.

In preparation of shells, first precursors were prepared.
—Preparation of Zn Precursor Solution—
40 mmol of zinc oleate and 100 mL of octadecene were mixed, and the mixture was heated under a vacuum at 110° C. for 1 hour to prepare a zinc precursor.
—Preparation of Se Precursor (Trioctyl Phosphine Selenide)—
22 mmol of selenium powder and 10 mL of trioctylphosphine were mixed in nitrogen and stirred until they were completely dissolved, and thereby a trioctyl phosphine selenide was obtained.
—Preparation of S Precursor (Trioctyl Phosphine Sulfide)—
22 mmol of sulfur powder and 10 mL of trioctylphosphine were mixed in nitrogen and stirred until they were completely dissolved, and thereby a trioctyl phosphine sulfide was obtained.

Shells were formed using the obtained precursors as follows.

(ZnSe/ZnS Shell)

The InP-based semiconductor nanoparticle dispersion solution obtained in Example 1 were heated to 250° C. At 250° C., 0.75 mL of the Zn precursor solution and 0.3 mmol of the trioctyl phosphine selenide were added thereto, the mixture was reacted for 30 minutes, and a ZnSe shell was formed on the surface of the InP-based semiconductor nanoparticles. In addition, 1.5 mL of the Zn precursor solution and 0.6 mmol of the trioctyl phosphine sulfide were added thereto, the mixture was heated to 280° C. and reacted for 1 hour, and thereby a ZnS shell was formed.

When the obtained semiconductor nanoparticles were observed using STEM-EDS, it was confirmed that they had a core/shell structure.

ZnSe/ZnS shells were formed on the InP-based semiconductor nanoparticles obtained in Examples 3, 6 to 12, 15, and 17, and Comparative Examples 1, 2, and 6 to 10 in the same method.

(GaP/ZnSe/ZnS Shell)

A mixture containing gallium acetylacetonate (0.30 mmol), oleic acid (0.90 mmol) and octadecene (3 mL) was heated under a vacuum at 110° C. and reacted for 1 hour to obtain gallium oleate. The container was filled with nitrogen, the InP semiconductor nanoparticle dispersion solution obtained in Example 2 was added thereto, and the temperature was raised to 280° C. Here, 0.15 mmol of tris(trimethylsilyl)phosphine was added over 30 minutes and a GaP shell was formed on the surface of the InP semiconductor nanoparticles.

Next, at 250° C., 0.75 mL of the zinc precursor and 0.14 mL (0.3 mmol) of the trioctyl phosphine selenide were added and the mixture was reacted for 30 minutes, and thereby a ZnSe shell was formed. In addition, 1.5 mL of the zinc precursor and 0.27 mL (0.6 mmol) of the trioctyl phosphine sulfide were added thereto, the mixture was heated to 280° C. and reacted for 1 hour, and thereby a ZnS shell was formed.

A GaP/ZnSe/ZnS shell was formed in the same method as in the InP-based semiconductor nanoparticles obtained in Example 13 and Comparative Example 3.

(ZnSeS Shell)

1.5 mL of zinc precursor solution, 0.3 mmol of the trioctyl phosphine selenide, and 0.3 mmol of the trioctyl phosphine sulfide were added to the InP semiconductor nanoparticle dispersion solution obtained in Example 4, and the mixture was heated at 280° C. for 1 hour, and thereby a ZnSeS shell was formed.

A ZnSeS shell was formed in the same method as in the InP-based semiconductor nanoparticles obtained in Example 14 and Comparative Example 4.

(ZnSeS Concentration Gradient Shell)

3.0 mL of zinc precursor solution, 0.2 mmol of the trioctyl phosphine selenide, and 0.1 mmol of the trioctyl phosphine sulfide were added to the InP semiconductor nanoparticle dispersion solution obtained in Example 5, and the mixture was heated at 280° C. for 30 minutes. Subsequently, 0.1 mmol of the trioctyl phosphine selenide, and 0.2 mmol of the trioctyl phosphine sulfide were added thereto and the mixture was kept at 280° C. for 30 minutes. In addition, 0.6 mmol of the trioctyl phosphine sulfide was added thereto and reacted at 280° C. for 1 hour, and thereby a ZnSeS concentration gradient shell was formed.

A ZnSeS concentration gradient shell was formed in the same method as in the InP-based semiconductor nanoparticles obtained in Example 16 and Comparative Example 5.

Optical properties of the obtained core/shell semiconductor nanoparticles were measured according to the above methods. Excitation light had a single wavelength of 450 nm.

TABLE 2

| | | Optical properties | |
|---|---|---|---|
| | Shell composition | Quantum efficiency [%] of core/shell semiconductor nanoparticles | FWHM [nm] of core/shell semiconductor nanoparticles |
| Example 1 | ZnSe/ZnS | 83.4 | 37.9 |
| Example 2 | GaP/ZnSe/ZnS | 72.8 | 39.8 |
| Example 3 | ZnSe/ZnS | 82.7 | 38.0 |
| Example 4 | ZnSeS | 76.1 | 39.2 |
| Example 5 | ZnSeS (concentration gradient) | 78.6 | 38.2 |
| Example 6 | ZnSe/ZnS | 85.0 | 37.2 |
| Example 7 | ZnSe/ZnS | 79.4 | 38.6 |
| Example 8 | ZnSe/ZnS | 81.0 | 38.7 |
| Example 9 | ZnSe/ZnS | 84.5 | 39.2 |
| Example 10 | ZnSe/ZnS | 81.7 | 39.0 |
| Example 11 | ZnSe/ZnS | 81.2 | 37.6 |
| Example 12 | ZnSe/ZnS | 79.8 | 37.8 |
| Example 13 | GaP/ZnSe/ZnS | 70.8 | 39.3 |
| Example 14 | ZnSeS | 76.2 | 38.8 |
| Example 15 | ZnSe/ZnS | 74.6 | 38.4 |
| Example 16 | ZnSeS (concentration gradient) | 77.8 | 38.1 |
| Example 17 | ZnSe/ZnS | 75.4 | 38.8 |
| Comparative Example 1 | ZnSe/ZnS | 68.7 | 46.3 |
| Comparative Example 2 | ZnSe/ZnS | 62.7 | 43.6 |
| Comparative Example 3 | GaP/ZnSe/ZnS | 51.5 | 47.7 |
| Comparative Example 4 | ZnSeS | 61.8 | 54.1 |
| Comparative Example 5 | ZnSeS (concentration gradient) | 60.3 | 49.6 |
| Comparative Example 6 | ZnSe/ZnS | 67.4 | 48.4 |
| Comparative Example 7 | ZnSe/ZnS | 66.8 | 50.8 |

TABLE 2-continued

| | Shell composition | Optical properties | |
|---|---|---|---|
| | | Quantum efficiency [%] of core/shell semiconductor nanoparticles | FWHM [nm] of core/shell semiconductor nanoparticles |
| Comparative Example 8 | ZnSe/ZnS | 37.0 | 77.2 |
| Comparative Example 9 | ZnSe/ZnS | 42.3 | 60.8 |
| Comparative Example 10 | ZnSe/ZnS | 41.8 | 55.7 |

REFERENCE CHARACTERS LIST

11 Core
12 Shell
26 Continuous flow reaction system
28A Fluid source
28B Fluid source
28C Fluid source
28D Fluid source
28E Fluid source
28F Fluid source
28G Fluid source
28H Fluid source
28I Fluid source
28J Fluid source
30 Reaction device
31 Precursor mixing device
32 Segmentation device
34 Main pipeline
36 Energy application activation stage
38 Incubation stage
40 Collection stage
42 Analysis device
43 Halogen treatment stage
44 Process controller
46 Intermediate shell production stage
48 External shell production stage
50 Purification stage

The invention claimed is:

1. Semiconductor nanoparticles including at least In, P, Zn and S, wherein the semiconductor nanoparticles include the aforementioned components other than In in the following ranges:
0.50 to 0.95 for P,
0.30 to 1.00 for Zn,
0.10 to 0.50 for S, and
0 to 0.30 for halogen,
in terms of molar ratio with respect to In.

2. The semiconductor nanoparticles according to claim 1, wherein a molar ratio of the halogen with respect to In is 0.03 to 0.30.

3. The semiconductor nanoparticles according to claim 1, wherein a full width at half maximum (Abs. FWHM) of a maximum peak of an absorption spectrum of the semiconductor nanoparticles is 60 nm or less.

4. Core/shell semiconductor nanoparticles having a structure in which the semiconductor nanoparticles according to claim 1 serve as a core and which includes a shell that covers at least a part of a surface of the core.

5. The core/shell semiconductor nanoparticles according to claim 4, wherein the shell is composed of one or more selected from the following (a) and (b):

(a) a Group IIIB-VB compound including at least, one or more elements selected from Group IIIB elements and one or more elements selected from Group VB elements, and (b) a Group IIB-VIB compound including at least, one or more elements selected from Group IIB elements and one or more elements selected from Group VIB elements.

6. The core/shell semiconductor nanoparticles according to claim 5, wherein the shell has a multi-layer structure containing any selected from the group consisting of the following (i), (ii) and (iii):

(i) two or more compounds each being the Group IIIB-VB compound (a) and having mutually different compositions, (ii) two or more compounds each being the Group IIB-VIB compound (b) and having mutually different compositions, and (iii) a combination of the Group IIIB-VB compound (a) and the Group IIB-VIB compound (b).

7. The core/shell semiconductor nanoparticles according to claim 4, wherein a concentration of an element constituting the shell changes in a thickness direction of the shell.

8. The core/shell semiconductor nanoparticles according to claim 5, wherein at least one of a number of the one or more elements selected from the Group IIIB elements, a number of the one or more elements selected from the Group VB elements, a number of the one or more elements selected from the Group IIB elements, and a number of the one or more elements selected from the Group VIB elements is more than one.

9. The core/shell semiconductor nanoparticles according to claim 4, wherein the shell contains at least Zn, S and Se.

10. The core/shell semiconductor nanoparticles according to claim 4, wherein the shell has a two-layer structure composed of a compound containing Zn and S and a compound containing Zn and Se.

11. The core/shell semiconductor nanoparticles according to claim 4, having a quantum efficiency (QY) of 70% or more.

12. The core/shell semiconductor nanoparticles according to claim 4, wherein a full width at half maximum (FWHM) of an emission spectrum of the core/shell semiconductor nanoparticles is 40 nm or less.

13. The semiconductor nanoparticles according to claim 2, wherein a full width at half maximum (Abs. FWHM) of a maximum peak of an absorption spectrum of the semiconductor nanoparticles is 60 nm or less.

14. Core/shell semiconductor nanoparticles having a structure in which the semiconductor nanoparticles according to claim 2 serve as a core and which includes a shell that covers at least a part of a surface of the core.

15. Core/shell semiconductor nanoparticles having a structure in which the semiconductor nanoparticles according to claim 3 serve as a core and which includes a shell that covers at least a part of a surface of the core.

16. Core/shell semiconductor nanoparticles having a structure in which the semiconductor nanoparticles according to claim 13 serve as a core and which includes a shell that covers at least a part of a surface of the core.

17. The core/shell semiconductor nanoparticles according to claim 14, wherein the shell is composed of one or more selected from the following (a) and (b):
   (a) a Group IIIB-VB compound including at least, one or more elements selected from Group IIIB elements and one or more elements selected from Group VB elements, and
   (b) a Group IIB-VIB compound including at least, one or more elements selected from Group IIB elements and one or more elements selected from Group VIB elements.

18. The core/shell semiconductor nanoparticles according to claim 15, wherein the shell is composed of one or more selected from the following (a) and (b):
   (a) a Group IIIB-VB compound including at least, one or more elements selected from Group IIIB elements and one or more elements selected from Group VB elements, and
   (b) a Group IIB-VIB compound including at least, one or more elements selected from Group IIB elements and one or more elements selected from Group VIB elements.

19. The core/shell semiconductor nanoparticles according to claim 16, wherein the shell is composed of one or more selected from the following (a) and (b):
   (a) a Group IIIB-VB compound including at least, one or more elements selected from Group IIIB elements and one or more elements selected from Group VB elements, and
   (b) a Group IIB-VIB compound including at least, one or more elements selected from Group IIB elements and one or more elements selected from Group VIB elements.

20. The core/shell semiconductor nanoparticles according to claim 17, wherein the shell has a multi-layer structure containing any selected from the group consisting of the following (i), (ii) and (iii):
   (i) two or more compounds each being the Group IIIB-VB compound (a) and having mutually different compositions,
   (ii) two or more compounds each being the Group IIB-VIB compound (b) and having mutually different compositions, and
   (iii) a combination of the Group IIIB-VB compound (a) and the Group IIB-VIB compound (b).

* * * * *